United States Patent [19]
Halbirt

[11] Patent Number: 5,340,072
[45] Date of Patent: Aug. 23, 1994

[54] LINKAGE ASSEMBLY FOR MECHANICAL ARM

[75] Inventor: J. Rick Halbirt, Hubbard, Oreg.

[73] Assignee: A-Dec, Inc., Newberg, Oreg.

[21] Appl. No.: 12,554

[22] Filed: Feb. 2, 1993

[51] Int. Cl.⁵ .............................................. E04G 3/00
[52] U.S. Cl. ................................ 248/279; 248/280.1
[58] Field of Search ............ 248/284, 286, 276, 278, 248/279, 280.1, 281.1, 298; 433/33, 77, 79

[56] References Cited

U.S. PATENT DOCUMENTS

| | | | |
|---|---|---|---|
| 3,489,384 | 1/1970 | Perbal | 248/280.1 |
| 3,650,033 | 3/1972 | Behne et al. | 433/33 |
| 3,762,051 | 10/1973 | Valeska | 433/33 |
| 3,771,226 | 11/1973 | Lieb et al. | 433/33 |
| 3,813,147 | 5/1974 | Rick | 297/191 |

FOREIGN PATENT DOCUMENTS 3038822  4/1981  Fed. Rep. of Germany.

OTHER PUBLICATIONS

Marcus Dental Products instruction manual, pp. III and IV, circa Jan., 1979.
AMPCO Dental Equipment Installation, Checkout & Adjustment Instruction four-page manual, first page, circa Jan. 1991.
English language abstract of German patent DE 30 38 822.

*Primary Examiner*—Ramon O. Ramirez
*Attorney, Agent, or Firm*—Klarquist Sparkman Campbell Leigh & Whinston

[57] ABSTRACT

The linkage assembly provides an adjustment mechanism for adjusting the effective length of a rod member pivotally attached between two posts. The adjustment mechanism reduces the need for small-tolerance pivot hole locations in the assembly and permits compensation for arm sag that is attributable to deflection or other factors.

13 Claims, 3 Drawing Sheets

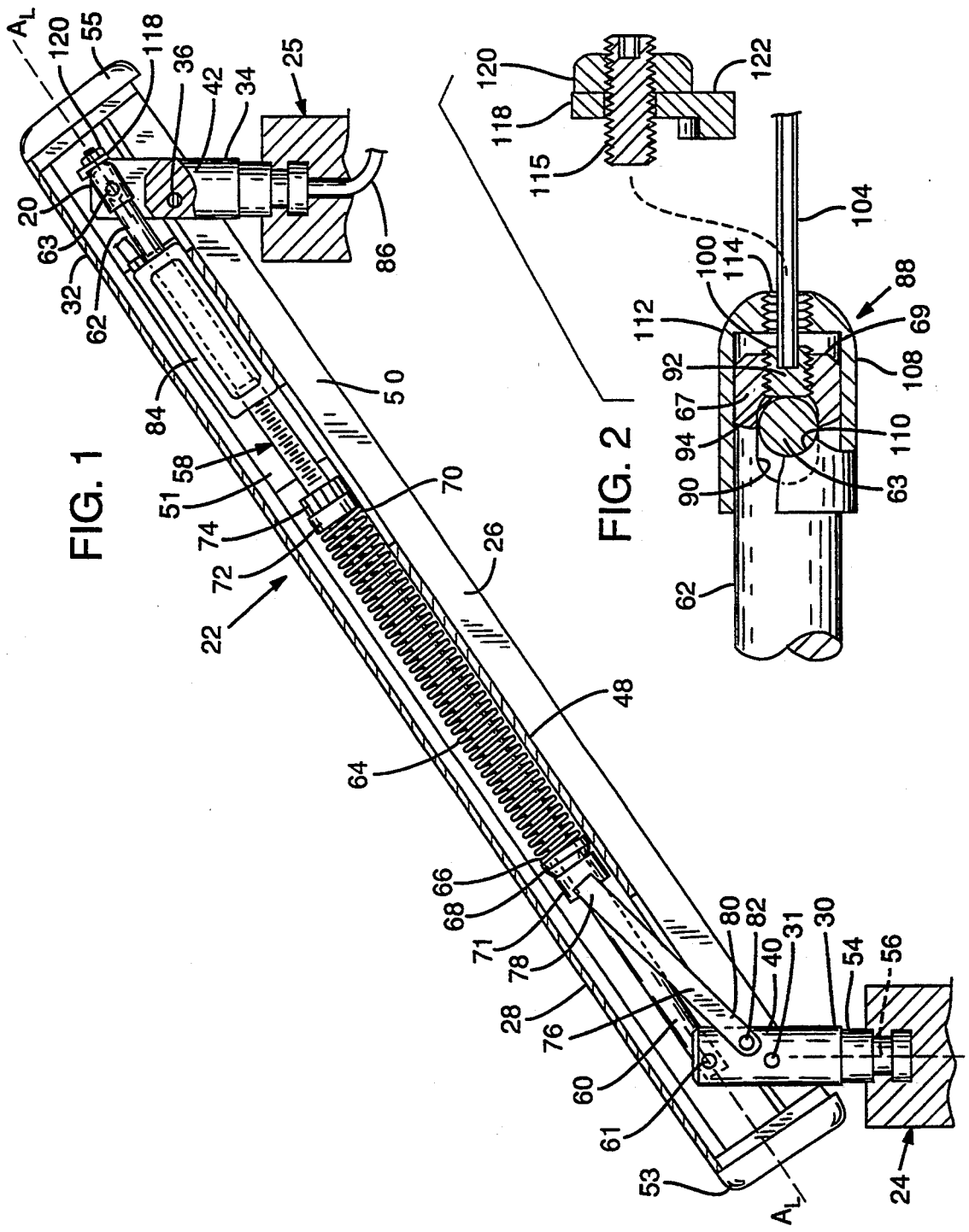

LINKAGE ASSEMBLY FOR MECHANICAL ARM

TECHNICAL FIELD

The present invention is directed to a linkage assembly for a mechanical arm. The mechanical arm may be used to support equipment such as dental instruments. The arm includes a parallel linkage assembly for maintaining the orientation of the supported equipment relative to horizontal throughout the pivotal motion of the arm.

BACKGROUND INFORMATION

A common use of mechanical arms in dentistry is for supporting dental instruments within reach of the dentist. A tray also may be held by the arm near the instruments. The arm usually includes a brake mechanism for locking the arm in a selected position to hold the tray and instruments at an elevation desired by the dentist. When the brake is released, the tray-holding end of the arm may be raised or lowered as desired.

The mechanical arm includes an elongated arm member that has each end pivotally fastened to a post. One post may be designated as an end post. The other post may be designated a support post that supports a structure for mounting the tray or equipment to the arm. The pivotal motion of the arm about the end post is in a generally vertical direction, although the end post may also be mounted for rotation about a generally vertical axis, thereby providing a generally horizontal motion for the arm. The tray and instruments may be mounted to the support post to be rotated about a vertical axis.

The mechanical arm also includes a rod member that is also pivotally connected at one end to the support post and at the other end to the end post. The rod member and arm member are pinned in generally parallel orientation. The rod member and arm member provide, in conjunction with the posts, a parallel linkage assembly so that as the arm is pivoted about the end post, the support post will retain its orientation relative to vertical, and the tray and instruments will remain horizontal throughout the pivotal motion of the arm.

The rod member may include an intermediate spring portion that is assembled over the rod between the end post and the rod member to counter the weight of the arm system. Accordingly, the spring portion prevents the arm from falling under its own weight whenever the brake is released.

In the past, the construction of a mechanical arm such as just described required small manufacturing tolerances for aligning the pivot axes in the arm and rod member with the axes in the posts. Proper alignment is important for proper operation of the parallel linkage assembly. The pivot axes are established in the arm components by the precise location of holes that receive the pivot pins.

SUMMARY OF THE INVENTION

The present invention is directed to a linkage assembly for a mechanical arm and provides a mechanism for constructing parallel linkage components without the need for very small-tolerance pivot hole locations as required in the past. The linkage assembly of the present invention generally comprises an elongated arm that is pivotally attached at each end between an end post and a support post. One end of a rod member is pivotally attached to the end post. The other end of the rod member is pivotally attached to the support post and includes an adjustment mechanism for adjusting the effective distance between the posts. The adjustment mechanism reduces the need for manufacturing the posts, arm, and rod member with all pivot locations precisely aligned prior to assembly.

The adjustment mechanism also permits after-assembly adjustment of the rod member length to compensate for sag in the arm system that may occur as a result of deflection of the rod member and from the presence of bearing clearances at the rotatably mounted posts. The mechanism also is available to compensate for sag arising from general wear of the pivot pins and bearings.

As another aspect of this invention, the adjustment mechanism also carries a limiter member that can be moved into and out of a position for restricting the amount of vertical travel of the arm.

BRIEF DESCRIPTION OF THE DRAWINGS

FIG. 1 is a side view, partly in section, of a mechanical arm system employing the linkage assembly of the present invention.

FIG. 2 is a detailed sectional view of the primary components of the linkage assembly showing the operation of the adjustment mechanism.

DESCRIPTION OF A PREFERRED EMBODIMENT

Figure 3:
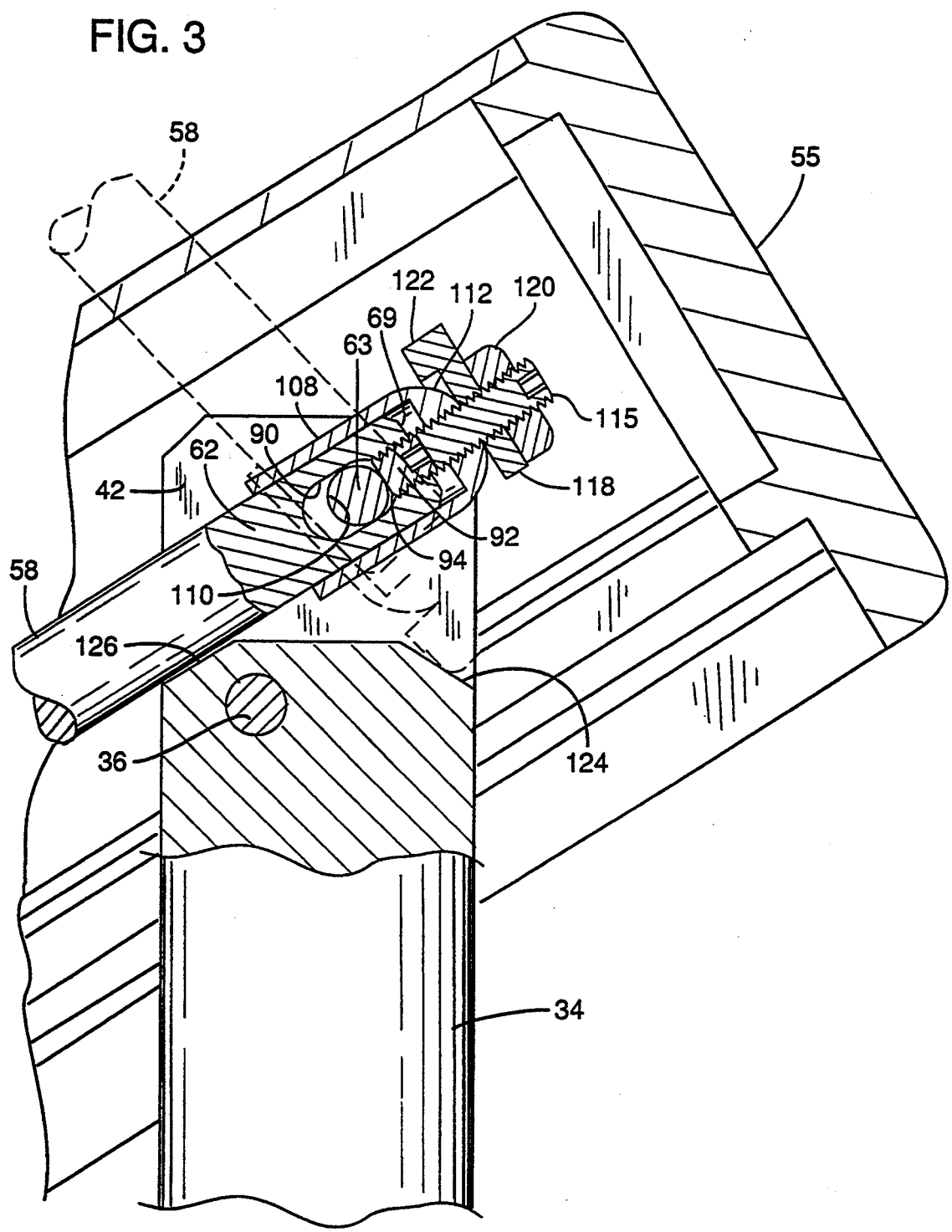
FIG. 3 is an enlarged cross-sectional view of the linkage assembly.

With reference to FIG. 1, the linkage assembly 20 of the present invention is used with a mechanical arm 22 for supporting equipment, such as a tray, within reach of a dentist. The mechanical arm can also support other dental equipment, such as dental instruments. The mechanical arm 22 includes an elongated, rigid arm member 26 that is pivotally attached at an outer portion 28 to an end post 30 by an outer pivot pin 31. An inner portion 32 of arm member 26 is pivotally attached to a support post 34 by way of an inner pivot pin 36.

The arm member 26 generally defines an elongated hollow box in lateral cross-section. The respective upper portions 40, 42 of end post 30 and support post 34 fit within openings defined by an underside 48 of arm member 26. As a result, upper portions 40, 42 of posts 30, 34 are generally enclosed by arm member 26. Vertical side walls 50 (one of which is shown in the section view of FIG. 1) of arm member 26 include apertures for receiving outer and inner pivot pins 31, 36. The open ends of arm member 26 are closed by end walls 53, 55.

A lower portion 54 of end post 30 is rotatably mounted to another support member, such as shown at 24 in FIG. 1. This mounting permits the arm to be rotated about a vertical axis 56 of end post 30. The lower portion 54 rests within conventional bearings, for which bearings very small clearances are provided.

The mechanical arm 22 includes another parallel linkage component, an elongated rod member 58, that has an outer end 60 pivotally attached to a pivot pin 61 on upper portion 40 of end post 30. An inner end 62 of rod member 58 is pivotally attached to a pivot pin 63 on upper portion 42 of support post 34. The upper portions 40, 42 of the posts each include an upwardly-opening slot into which the rod member ends fit for the pivotal attachment just described (see FIG. 3).

The rod member 58 is attached to posts 30, 34 so that its longitudinal axis is generally parallel to the longitudinal axis of arm member 26, thereby defining a parallel linkage that is useful, for example, for holding a tray support 25 horizontal as the inner portion 32 of mechanical arm 22 is swung upwardly or downwardly. The effective length of rod member 58 extending between pivot pins 61, 63 is defined as an adjustable support length. As described in more detail below, the total length of rod member 58 includes the support length in addition to a rod extension 67 (FIG. 2) extending from pivot pin 63 to the end 69 of the rod.

An elongated helical spring 64 is carried on rod member 58, with one end 66 of spring 64 being received within a cup 68 that is attached to a smooth-bored part 71 that slides over rod member 58 near end post 30. The other end 70 of spring 64 contacts a thrust bearing 72.

A pair of links 76 (one shown in FIG. 1) are connected between the sliding part 71 and end post 30. One end 78 of each link is pivotally attached to sliding part 71. Each link 76 extends in generally angular relationship to rod member 58 so that its other end 80 is connected by way of an intermediate pivot pin 82 to one side of end post 30. The pivot pins 31, 61, 82 are spaced apart on end post 30 so that pivot pin 82 is positioned between pivot pins 31, 61.

Immediately adjacent the thrust bearing 72, rod member 58 is threaded to threadably receive an adjustment nut 74 for moving bearing 72 along the length of rod member 58 to change the amount of deflection in the spring 64. Preferably, adjustment nut 74 is adjusted so that the deflection of spring 64 provides sufficient spring force to counter the weight of mechanical arm 22, tray support 25, and any instruments.

In a preferred embodiment, rod member 58 has, at its inner end 62, a brake mechanism 84 that may be activated, for example, by air pressure delivered through a flexible conduit 86, for forcing brake pads (not shown) against opposing inner plates 51 carried within arm member 26. The brake mechanism holds mechanical arm 22 immovable relative to posts 30, 34 until it is desirable to move the mechanical arm by releasing the pressure in brake mechanism 84. Spring 64 and brake mechanism 84 are configured to cooperate so that spring 64 prevents mechanical arm 22 from falling under its own weight whenever brake mechanism 84 is released.

In accordance with the present invention, the inner end 62 of rod member 58 is connected to an adjustment mechanism 88 (best seen in FIGS. 2 and 5) for adjusting the effective length (designated support length) of the rod member 58 between the pivot pins 61, 63.

The inner end 62 of rod member 58 has an oval-shaped slot 90 (best seen in FIG. 5) formed through it. The slot 90 is transversely oriented to the longitudinal axis (shown as axis $A_L$ in FIG. 1) of rod member 58. Pivot pin 63 passes through support post 34. The ends of the pin 63 are fastened to a side wall 50 of the arm member 26. The adjustment mechanism 88 operates to adjust the position of the rod member relative to pivot pin 63 (that is, change the rod support length defined between pins 61 and 63) and, once that position is established, to lock rod member 58 against movement relative to pin 63. The adjustment mechanism, therefore, eliminates the need for manufacturing the rod member with pivot holes precisely defined prior to assembly.

The adjustment mechanism 88 includes an adjustment screw 92 that is connected to the inner end 62 of rod member 58 and is movable relative thereto. More specifically, the adjustment screw 92 is threaded into an opening 97 (FIG. 5) in rod end 69, concentric with axis $A_L$. The screw 92 has a contact end 94 that is movable within slot 90 for contacting the pivot pin 63. As a consequence, movement of adjustment screw 92 changes the rod support length between the pivot pins 61, 63 of end post 30 and support post 34. The screw end 100 opposite contact end 94 is configured to have a socket 102 for receiving an Allen wrench 104 (FIG. 2). Adjustment screw 92 is movable relative to rod inner end 62 by turning the screw within threaded opening 97 for bringing contact end 94 into contact with pivot pin 63 and adjusting the rod support length.

Adjustment mechanism 88 also includes a locking mechanism operable for locking the rod member 58 against longitudinal motion (along the axis $A_L$) relative to support post 34 once the desired support length has been established. More particularly, the locking mechanism prevents the rod end 62 from shifting longitudinally (toward the right in FIG. 2) after the effective length has been established by threading screw 92 against pin 63.

Figure 5:
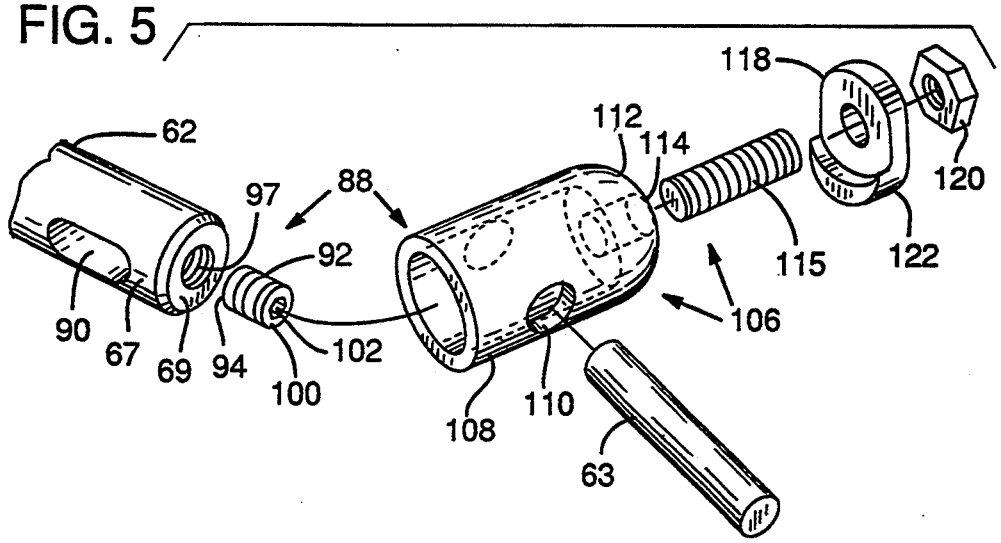
FIG. 5 is an exploded view of the linkage assembly showing the primary components of the adjustment mechanism.

In a preferred embodiment of the present invention, the locking mechanism 106 includes a cup-shaped sleeve 108 (see FIGS. 3 and 5). One end of the sleeve is open to receive the inner end 62 of rod member 58. The other end 112 of the sleeve is closed, except for a threaded aperture 114 that is concentric with the longitudinal axis $A_L$ of the rod. The inner end 62 of the rod member 58 is inserted into sleeve 108 to align slot 90 and an aperture 110 that extends transversely through the sleeve. The pivot pin 63 is passed through the aperture 110 and slot 90. As a result, the inner end 62 is movable within the sleeve 108 relative to support post 34. When inner end 62 is positioned inside sleeve 108, threaded opening 114 is co-axial with threaded opening 97 of inner end 62 of rod member 58. A feature of this co-axial arrangement is discussed below.

In a preferred embodiment, the locking mechanism 106 includes a locking screw 115 that is threaded through the aperture 114 in the sleeve 108 to bear against the screw 92 as shown in FIG. 3. As a result, the locking screw 115 prevents the outermost end 69 of the rod from shifting toward the sleeve end 112.

Figure 4:
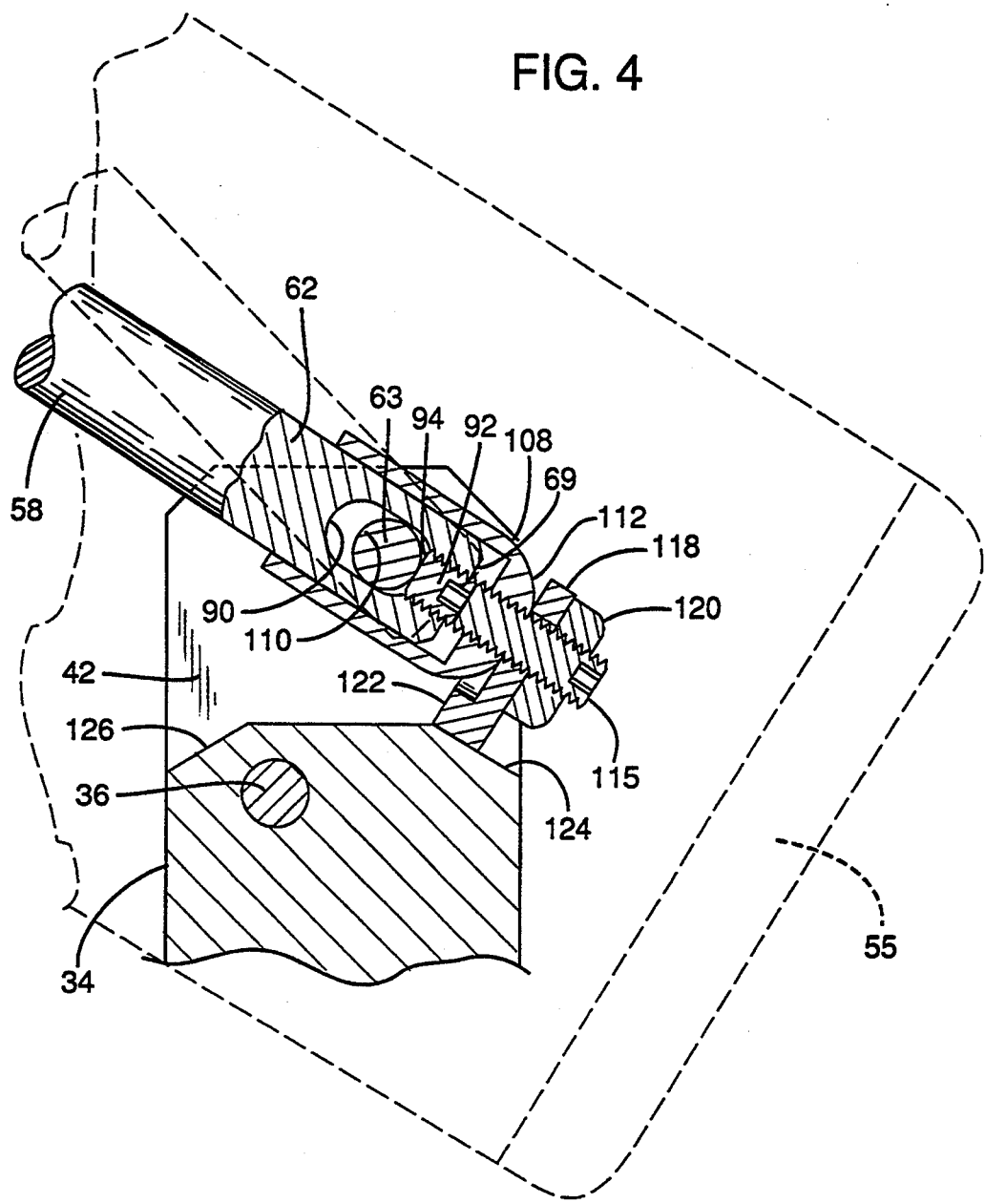
FIG. 4 is an enlarged cross-sectional view of the linkage assembly showing the operation of the limiter member.

With the end post 30 held at a constant elevation, the inner end of the arm 22, including support post 34, may be swung in the upward and downward direction so that rod member 58 pivots about pivot pins 61 and 63. As another aspect of this invention, this range of travel of the rod member 58 (hence, arm 22) may be limited by a limiter member 118 that is rotatably mounted to locking screw 115 between the rounded end 112 of the sleeve and a lock nut 120 that is threaded to the outer end of locking screw 115. The limiter member 118 has an enlarged end 122 (see FIG. 5). The limiter member 118 may be swung about the long axis of screw 115 so that the enlarged end 122 moves downwardly into a limiting position (FIG. 4). With the member 118 in the limiting position, the inner end 62 of the rod member 58 can be swung downwardly until end 122 of limiter member 118 abuts a chamfered surface 124 that defines part of the above-mentioned slot in the support post 34.

The contact between the end 122 and surface 124 limits the downward vertical travel of rod member 58.

The amount of downward vertical travel of rod member 58 is increased (shown in dashed lines in FIG. 4) when limiter member 118 is in a non-limiting position, that is, when end 122 (best shown in FIG. 3) is turned upwardly and away from chamfered surface 124. In the non-limiting position, the inner end 62 of rod member 58 can be moved upwardly until lock nut 120 contacts the chamfered surface 124 the rod member 58 (hence, arm 22) swings about the end post 30.

The solid lines in FIG. 3 show that the inner end 62 of rod member 58 may be moved upwardly until the rod member contacts another chamfered surface 126 of support post 34.

The adjustment mechanism 88 also permits after-assembly adjustment of the rod support length to compensate for sag in the arm system that may occur as a result of tolerance variations, bearing clearances, wear or other conditions that may call for adjustment of the parallel linkage defined by the arm mechanism. Adjustment screw 92 can be re-adjusted by first removing locking screw 115 and then re-adjusting the position of the screw 92 relative to the rod end 62. The locking screw 115 is thereafter moved against the adjustment screw 92 as described above.

While the present invention has been described in accordance with a preferred embodiment, it is to be understood that various substitutions and alterations may be made thereto without departing from the spirit and scope of the appended claims.

The invention claimed is:

1. A linkage assembly for a mechanical arm system, comprising:
   a first post member;
   a second post member;
   an elongated arm member pivotally attached to the first post member and pivotally attached to the second post member;
   an elongated rod member having a first end pivotally attached to the first post member and a second end pivotally attached to the second post member, the rod member having a support length extending between the first and second post members, the first and second post members and the arm member and rod member defining a linkage arranged such that the arm member and rod member remain substantially parallel throughout the pivotal motion of the arm member and rod member; and
   an adjustment mechanism connected to the rod member for moving the second end of the rod member relative to the second post thereby changing the support length of the rod member between the first and second post members.

2. A linkage assembly for a mechanical arm system, comprising:
   a first post member;
   a second post member;
   an elongated arm member pivotally attached to the first post member and pivotally attached to the second post member;
   an elongated rod member having a first end pivotally attached to the first post member and a second end pivotally attached to the second post member, the rod member having a support length extending between the first and second post members, the first and second post members and the arm member and rod member defining a linkage arranged such that the arm member and rod member remain substantially parallel throughout the pivotal motion of the arm member and rod member; and
   an adjustment mechanism connected to the rod member for moving the second end of the rod member relative to the second post thereby changing the support length of the rod member between the first and second post members; and
   the second end of the rod member having a slot formed therein and wherein the rod member is attached to the second post member by a pivot pin that is fastened to the second post member and that passes through the slot, the adjustment mechanism including an adjustment element connected to the rod member and movable relative to the rod member, the adjustment element having a contact end that is movable within the slot for contacting the pivot pin so that movement of the adjustment element changes the support length of the rod member between the first and second post members.

3. The assembly of claim 2 wherein the adjustment element includes an adjustment screw that is threaded into the second end of the rod to extend into the slot to contact the pivot pin.

4. The assembly of claim 2 wherein the adjustment mechanism also includes lock means for locking the rod member against longitudinal motion relative to the second post member.

5. The assembly of claim 4 wherein the lock means includes:
   a sleeve having an aperture formed therein through which the pivot pin passes, the second end of the rod member being received within the sleeve; and
   a locking element connected to the sleeve for movement relative thereto, the locking element being movable to extend between the second end of the rod and the sleeve to prevent longitudinal motion of the rod member relative to the second post member.

6. The assembly of claim 5 wherein the locking element is a locking screw threaded through the sleeve along an axis that is coaxial with the axis along which the adjustment element is threaded.

7. The assembly of claim 5 wherein the locking element extends to contact the adjustment member to prevent longitudinal motion of the rod member relative to the second post member.

8. The assembly of claim 4 wherein the rod member is movable about the first post member to travel through a predetermined range of travel, the adjustment mechanism including a limiter member connected to the rod member and movable into and out of a limiting position for restricting the range of travel of the rod member.

9. The assembly of claim 1 wherein the rod member is pivotable about its first end to travel through a predetermined range of travel, the adjustment mechanism including a limiter member connected to the rod member and movable into and out of a limiting position for restricting the range of travel of the rod member.

10. The assembly of claim 4 wherein the lock means includes a second threaded member that threads through the sleeve to bear upon the adjustment element.

11. The assembly of claim 1 wherein the adjustment mechanism includes lock means for locking the rod member against longitudinal motion relative to the second post member.

12. An adjustment mechanism for changing a support length of a rod member extending between a first post and a second post, the rod member being pivotally connected at a first end to a first pivot pin and pivotally connected at a second end to a second pivot pin that passes through an elongated slot is defined in the second end of the rod member, the adjustment mechanism comprising:

an adjustment screw connected to the rod member and having a contact end that is movable within the slot for contacting the pivot pin at any selected position along the length of the slot;

a sleeve enclosing part of the second end of the rod member and having an aperture formed therein through which the pivot pin passes; and a locking screw threaded through the sleeve to bear upon the adjustment screw for preventing movement of the contact end away from the pivot pin.

13. The mechanism of claim 12 wherein the rod member is pivotable about the first pivot pin to travel through a predetermined range of travel, the adjustment mechanism including a limiter member connected to the rod and movable into and out of a limiting position for restricting the travel range of the rod member.

* * * * *